Patented June 17, 1930

1,764,996

UNITED STATES PATENT OFFICE

LIONEL T. ANDREWS, OF NORTH JAMAICA, NEW YORK, ASSIGNOR TO E. R. SQUIBB & SONS, OF NEW YORK, N. Y., A CORPORATION OF NEW YORK

STABLE EFFERVESCENT COMPOSITION

No Drawing.   Application filed April 12, 1928. Serial No. 269,618.

My invention relates to effervescent mixtures, particularly those for medicinal purposes, and to substances to be used as constituents thereof.

Effervescent mixtures as heretofore prepared, usually containing citric acid as their acidic ingredient, have been unstable, especially when subjected to high temperatures or considerable humidity, such as are encountered in various regions and during the summer and rainy seasons. In these circumstances, the components of the mixture interact prematurely and the preparation loses a large portion of its effervescent power in a relatively short time, the liberation of gases frequently being so great as to eject the stopper from the container. If exposed to the atmosphere for a period of about two days, these preparations generally become incapable of further effervescence.

It has been attempted to substitute tartaric acid for citric in order to overcome these disadvantages, but tartaric acid is open to the objection that it reacts with any potassium compounds that may be present to form the comparatively insoluble salt potassium bitartrate, whereas rapid solubility is essential to the efficacy of effervescent preparations.

It is an object of my invention to provide for effervescent compositions an ingredient that shall render them stable under ordinary conditions and even when unusual temperatures and humidities prevail.

I have found that soluble acid citrates, particularly mono-alkali-metal dihydrogen citrates, are well suited to replace citric acid as the acidic ingredient of effervescent preparations, being undecomposable by temperatures as high as 120° C. In admixture with an alkali-metal bicarbonate, such salts may be exposed to air for indefinite periods without acting on the said bicarbonate; and the active life of the preparation under the various conditions of storage and use is thereby very much prolonged. In fact, I now have samples that have already lain open to the action of the atmosphere for about five months without suffering any diminution in effervescibility. Furthermore, such acid citrates, when acted upon by potassium compounds, form salts readily soluble in water.

In preparing effervescent compositions in accordance with my invention, I follow the customary procedures for like compositions of the prior art except that I substitute for the citric acid in the latter a slightly greater, say by about 15%, proportion of my acid citrates. For example, in making effervescent triple bromide tablets I merely intermingle the following ingredients in the relative proportions specified and compress the mixture: monosodium dihydrogen citrate 240, sodium bicarbonate 127, sodium bromide 58, potassium bromide 58, ammonium bromide 29.

By the term "alkali metal" as used herein I mean to include not only the members of the alkali group but also ammonium.

It will be understood that the specific processes and substances given herein are merely illustrative of the practice of my invention and that various changes may be made within the scope of the accompanying claims without departing from the invention or sacrificing any of the advantages thereof.

I claim:

1. An effervescent composition containing a soluble acid citrate.

2. An effervescent composition containing an alkali-metal acid citrate.

3. An effervescent composition containing a mono-alkali-metal dihydrogen citrate.

4. An effervescent composition containing monosodium dihydrogen citrate.

5. As an acidic ingredient of effervescent compositions monosodium dihydrogen citrate.

In testimony whereof I affix my signature.

LIONEL T. ANDREWS.